(12) United States Patent
Jainek

(10) Patent No.: US 11,644,111 B2
(45) Date of Patent: May 9, 2023

(54) SLIDE VALVE FOR A FILTER SYSTEM AND FILTER SYSTEM WITH A SLIDE VALVE

(71) Applicant: MANN+HUMMEL GmbH, Ludwigsburg (DE)

(72) Inventor: Herbert Jainek, Heilbronn (DE)

(73) Assignee: MANN+HUMMEL GmbH, Ludwigsburg (DE)

( * ) Notice: Subject to any disclaimer, the term of this patent is extended or adjusted under 35 U.S.C. 154(b) by 192 days.

(21) Appl. No.: 17/142,912

(22) Filed: Jan. 6, 2021

(65) Prior Publication Data

US 2021/0207724 A1 Jul. 8, 2021

(30) Foreign Application Priority Data

Jan. 8, 2020 (DE) .......................... 102020100198.3

(51) Int. Cl.
| | |
|---|---|
| *F16K 11/04* | (2006.01) |
| *B01D 35/30* | (2006.01) |
| *B01D 35/153* | (2006.01) |
| *B01D 29/11* | (2006.01) |
| *F01M 11/03* | (2006.01) |

(52) U.S. Cl.
CPC ............ *F16K 11/04* (2013.01); *B01D 29/114* (2013.01); *B01D 35/153* (2013.01); *B01D 35/30* (2013.01); *B01D 2201/162* (2013.01); *B01D 2201/342* (2013.01); *B01D 2201/347* (2013.01); *F01M 11/03* (2013.01)

(58) Field of Classification Search
CPC ..... F16K 11/04; B01D 29/114; B01D 35/153; B01D 35/30; B01D 2201/162; B01D 2201/342; B01D 2201/347; B01D 29/21; B01D 35/16; B01D 35/147; B01D 2201/0415; F01M 11/03; F01M 2011/031
USPC ....... 210/430, 429, 130, 235, 234, 248, 282, 210/455, 450
See application file for complete search history.

(56) References Cited

U.S. PATENT DOCUMENTS

| | | | |
|---|---|---|---|
| 2,869,570 A * | 1/1959 | Wilkerson | ................ F16T 1/14 210/429 |
| 2003/0168390 A1 | 9/2003 | Jainek | |
| 2004/0232063 A1 | 11/2004 | Cline et al. | |
| 2015/0157968 A1* | 6/2015 | Ardes | .................... B01D 35/16 210/232 |

* cited by examiner

*Primary Examiner* — Madeline Gonzalez

(57) ABSTRACT

A filter system is provided with a housing provided with a cover. The housing has a raw liquid inlet, a clean liquid outlet, and a liquid drain. A filter element is provided that separates a raw side from a clean side. A slide valve with a valve rod and a sealing head is provided, wherein the sealing head is arranged such that the liquid drain of the housing is closable but openable. A coupling is arranged between the sealing head and the valve rod, providing an axial securing action of the valve rod at the sealing head and a radial securing action, separate from the axial securing action, of the valve rod at the sealing head. A slide valve for such a filter system as well as a sealing head and a valve rod for such a slide valve are provided.

9 Claims, 8 Drawing Sheets

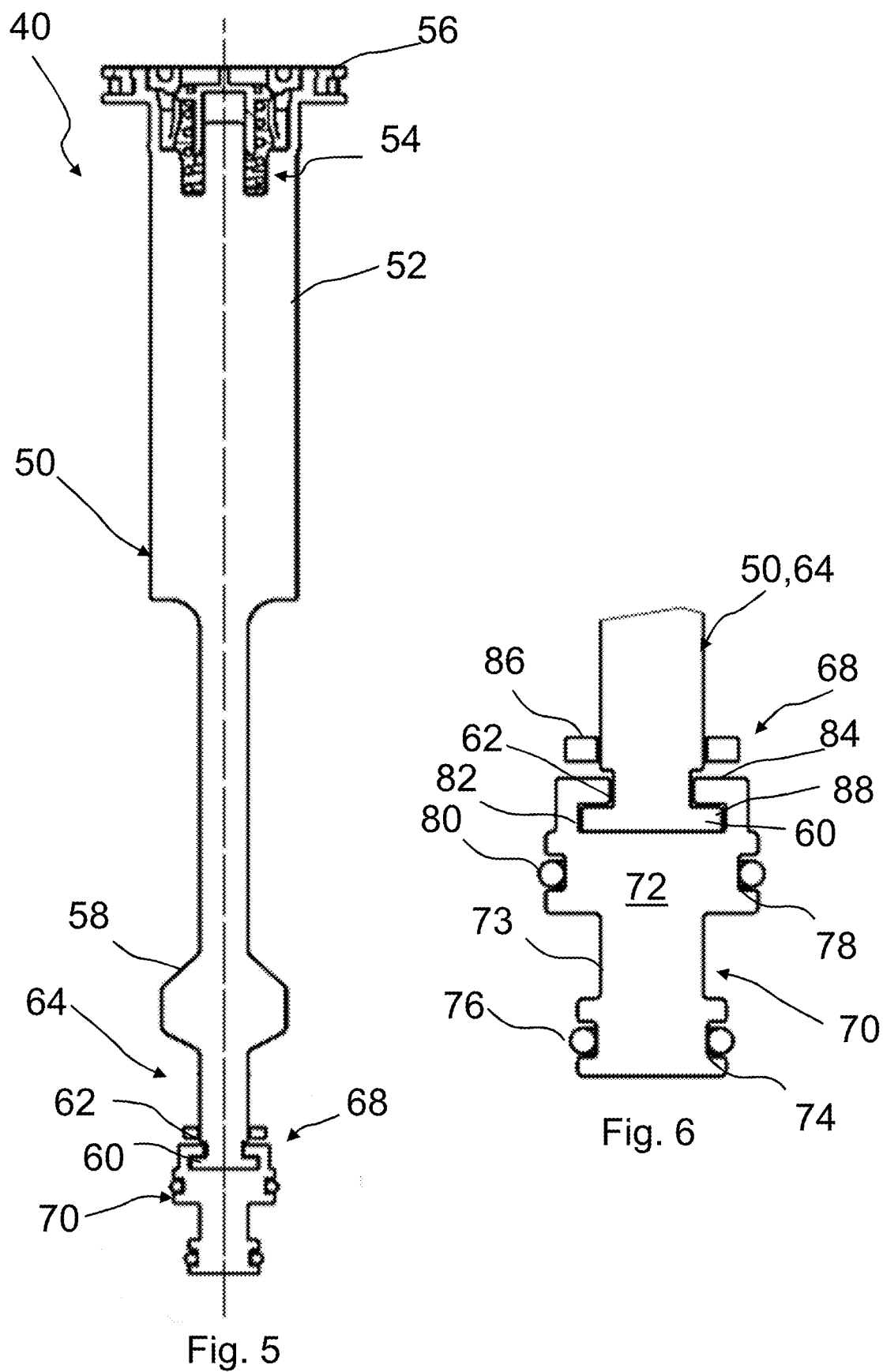

SLIDE VALVE FOR A FILTER SYSTEM AND FILTER SYSTEM WITH A SLIDE VALVE

BACKGROUND OF THE INVENTION

The invention concerns a slide valve for a filter system as well as a filter system with a slide valve.

EP 1307274 B1 discloses an oil filter system with a filter element and a slide valve which is movable within the filter element. The slide valve is installed such in the housing that it closes a liquid drain integrated in the housing in its first end position. In this context, the slide valve comprises a first sealing region which seal-tightly separates the clean side from the liquid drain. A second sealing region seal-tightly separates the raw side, connected by a connecting line to the liquid drain, from the liquid drain. For this purpose, two axially spaced-apart O-rings are arranged at the slide valve in the sealing region. The hollow cylindrical filter element is arranged about a grid-shaped support body.

So that the slide valve is not removed from the housing, a locking means is arranged in the lower region of the slide valve which, during initial assembly, is locked in the housing and then remains in the housing. The locking means enables a limited axial movement of the slide valve within the housing. The individual components of the slide valve are connected by a rod. At its upper end, the rod comprises a spherical head which is centrally snap-connected with the support body in one embodiment. Alternatively, the spherical head can be snap-connected to a connecting member that is connected to the housing cover. For exchange of the filter element, the snap connection can be released whereby the support body is pulled a bit upwardly. The locking means in the lower region of the slide valve prevents that the slide valve is pulled farther out of the housing so that the slide valve with its seals remains in the housing.

The invention has the object to provide a filter element with a slide valve for a filter system that enables a simple exchange of seals of the slide valve.

A further object is providing a slide valve for a filter system with exchangeable seals of the slide valve.

A further object is providing a sealing head for a slide valve for a filter system with exchangeable seals of the slide valve.

A further object is providing a valve rod for a slide valve for a filter system with exchangeable seals of the slide valve.

SUMMARY OF THE INVENTION

The aforementioned object is solved according to one aspect of the invention by a filter system, in particular for a liquid, in particular for lubricant oil of an internal combustion engine, comprising a housing with cover, wherein the housing comprises a raw liquid inlet, a clean liquid outlet, and a liquid drain, further comprising a filter element that separates a raw side from a clean side, and a slide valve with a valve rod and a sealing head, and wherein the sealing head is arranged such that the liquid drain of the housing is closable but openable, wherein a coupling is arranged between the sealing head and the valve rod, with an axial securing action of the valve rod at the sealing head and a radial securing action of the valve rod at the sealing head, wherein the radial sealing action is separate from the axial sealing action.

The further object regarding a slide valve is solved by a slide valve for a filter system, with a valve rod and a sealing head, wherein a coupling is arranged between the sealing head and the valve rod, with an axial securing action of the valve rod at the sealing head and a radial securing action of the valve rod at the sealing head, wherein the radial sealing action is separate from the axial sealing action.

The further object regarding a sealing head is solved by a sealing head for a slide valve for a filter system, comprising a body, wherein a coupling is integrated in the body or is arranged at the body and is provided for axial securing of a coupling element of a valve rod as well as for separate radial securing of the valve rod.

The further object regarding a valve rod is solved by a valve rod for a slide valve for a filter system, comprising a coupling element that is provided for axial securing of the valve rod at a sealing head.

Beneficial embodiments and advantages of the invention result from the additional claims, the description, and the drawing.

A filter system is proposed, in particular for a liquid, in particular for lubricant oil of an internal combustion engine, comprising a housing with cover, wherein the cover comprises a raw liquid inlet, a clean liquid outlet, and a liquid drain, further comprising a filter element that separates a raw side from a clean side, and a slide valve with a valve rod and a sealing head, and wherein the sealing head is arranged such that the liquid drain of the housing is closable but openable. A coupling is arranged between the sealing head and the valve rod with an axial securing action of the valve rod at the sealing head and a radial securing action of the valve rod at the sealing head, wherein the radial sealing action is separate from the axial sealing action.

Advantageously, the sealing head can be simply replaced by a new sealing head upon exchange of the filter element. The sealing head enables in this context emptying of the filter element when the cover of the housing is opened. Due to the robust axial securing action, the sealing head can be removed, without being destroyed, from the housing when the filter element is exchanged. Due to the radial securing action, the sealing head can be inserted into the housing without being lost.

Since the valve rod and sealing head are two components that are connected only by a coupling, upon insertion of the slide valve, in particular upon screwing in the slide valve with the cover, decoupling of the two rigid parts can be effected so that a secure assembly is achieved even in case of distortion and tolerances of the components.

According to a beneficial configuration of the filter system, the coupling can be integrated into the sealing head. This enables a particularly simple exchange of the sealing head and a robust configuration of the coupling.

According to a beneficial embodiment of the filter system, the sealing head can comprise, for axial securing, at least one receptacle for a coupling element of the valve rod. In particular, the valve rod can comprise a collar or a disk as a coupling element and the receptacle can engage across the coupling element at least in sections thereof at the periphery. Advantageously, the coupling element of the valve rod can be of rotational symmetry.

According to a beneficial embodiment of the filter system, the sealing head can comprise at least one clamping element for radial securing. For example, the valve rod can be clipped on or locked upon insertion of the coupling element into the clamping element.

According to a beneficial embodiment of the filter system, the valve rod can be attached to the cover. This enables a simple mounting and demounting of the slide valve with the cover.

According to a beneficial embodiment of the filter system, the sealing head together with the valve rod can be removable from the housing without being destroyed. The valve rod with the cover can be a lifetime component and the sealing head can be simply exchanged as needed.

According to a beneficial embodiment of the filter system, the sealing head can comprise two sealing elements that are axially spaced apart relative to each. The sealing area therebetween seals the liquid drain and releases the latter when the sealing head is lifted by the slide valve upon removal of the cover. In this way, the filter element can empty.

In a beneficial embodiment, the sealing elements at the sealing head can be embodied by at least one O-ring or/and at least one elastomer applied to the sealing head by the two-component method.

According to a further aspect of the invention, a slide valve is proposed for a filter system according to the invention, with a valve rod and a sealing head. A coupling is arranged between the sealing head and the valve rod, with an axial securing action of the valve rod at the sealing head and a radial securing action, separate therefrom, of the valve rod at the sealing head.

Advantageously, the sealing head can be simply replaced with a new sealing head upon exchange of the filter element. The sealing head enables in this context emptying of the filter element when the cover of the housing is opened. Due to the robust axial securing action, the sealing head can be removed from the housing without being destroyed when the filter element is exchanged. Due to the radial securing action, the sealing head can be inserted into the housing without being lost.

According to a beneficial embodiment of the slide valve, the coupling can be integrated into the sealing head. This enables a compact and robust configuration of the sealing head and of the coupling.

According to a beneficial embodiment of the slide valve, the sealing head can comprise, for axial securing, at least one receptacle for a coupling element of the valve rod. In particular, the valve rod can have a collar or a disk as a coupling element and the receptacle can engage across the coupling element at least in sections at the periphery. The receptacle can be embodied as a ring segment at the outer periphery of the sealing head that is radially inwardly open so that the coupling element can be pushed into the receptacle in radial direction.

Beneficially, the receptacle can have an insertion opening at one side of the sealing head for insertion form that side. Advantageously, diametrically opposed to the insertion opening an ejecting window can be provided through which the coupling element of the valve rod can be pushed out of the receptacle. Optionally, two diametrically opposed insertion openings can be provided. Then the coupling element can be axially secured by two diametrically opposed elements.

According to a beneficial embodiment of the slide valve, the sealing head can comprise at least one clamping element for radial securing. For example, the valve rod can be clipped on or locked upon insertion of the coupling element into the clamping element. The connection can be easily produced and easily released. In particular, the clamping element can be spaced axially from the receptacle. Advantageously, the valve rod can comprise a constriction such that, upon insertion into the receptacle, its cover engages the constriction. In this way, a large region of the coupling element can be pushed into the receptacle; the connection is especially robust.

According to a beneficial embodiment of the slide valve, the sealing head can be fastened exchangeably at the valve rod. Advantageously, the coupling element can be pushed out of the receptacle whereby, at the same time, the clamping element can be released. The exchange can be done practically without tools.

Moreover, according to a further aspect of the invention, a sealing head for a slide valve according to the invention is proposed, comprising a body, wherein a coupling is integrated into the body or is arranged at the body and is provided for axial securing of a coupling element of a valve rod as well as for separate radial securing of the valve rod.

The receptacle can be embodied like a pocket so that the coupling element can be pushed into the receptacle and a region of the receptacle covers at least a part of the rim of the coupling element.

According to a further aspect of the invention, a valve rod for a slide valve according to the invention is proposed, comprising a coupling element that is provided for axial securing of the valve rod at a sealing head.

The coupling element can be in the form of a collar or a disk arranged at the valve rod and can be provided to be pushed into a receptacle of the coupling and in this context to be covered at least in rim regions by a region of the receptacle.

BRIEF DESCRIPTION OF THE DRAWINGS

Further advantages result from the following drawing description. In the drawings, embodiments of the invention are illustrated. The drawings, the description, and the claims contain numerous features in combination. A person of skill in the art will consider the features expediently also individually and combine them to expedient further combinations.

FIG. 5 shows a longitudinal section of the slide valve according to FIG. 2.

FIG. 6 shows a detail of the connection between valve rod and sealing head according to FIG. 2 with separate axial securing action and radial securing action of the valve rod at the sealing head.

DESCRIPTION OF PREFERRED EMBODIMENTS

Figure 1:
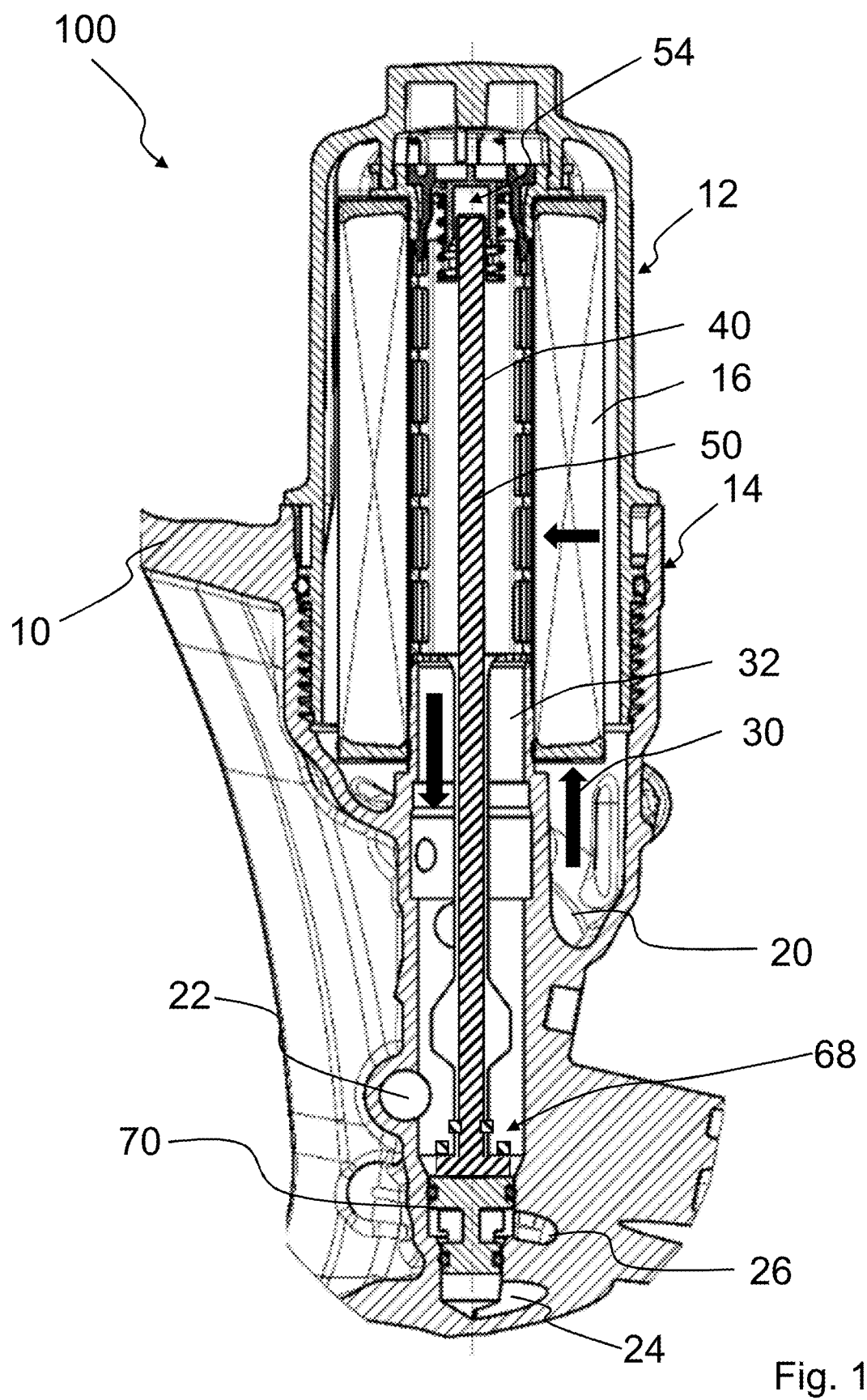
FIG. 1 shows a section through a filter system with slide valve according to an embodiment of the invention.

In the Figures, same or similar components are identified with same reference characters.

FIG. 1 shows a section through a filter system 100 with slide valve 40 according to an embodiment of the invention. The filter system 100 is in particular an oil filter system for lubricant oil of an internal combustion engine. The filter system 100 comprises a housing 10 with a cover 12 that can be screwed onto a housing pot 14.

The housing 10 comprises a raw liquid inlet 20, a clean liquid outlet 22, and a liquid drain 26. Moreover, a return line 24 to the oil pan is provided. Raw liquid flows from the exterior to the interior through the filter element 16 which separates a raw side 30 from a clean side 32. The flow direction of the liquid is indicated by black arrows.

At the cover 12, a slide valve 40 with a valve rod 50 and a sealing head 70 is fastened. The sealing head 70 is arranged at the end of the valve rod 50 remote from the cover and is connected by a coupling 68 to the valve rod 50. The coupling 68 enables a destruction-free separation of the sealing head 70 from the valve rod 50.

In the illustrated installation position, the two seals of the sealing head 70, which are axially spaced apart form each other and not identified in detail, seal a liquid drain 26. When the cover 12 is detached in order to exchange the filter element 16, the slide valve 40 is lifted with the cover 12. In this way, the liquid drain 26 and the return line 24 are opened and the liquid drains from the clean (32) and raw oil region (30) into the oil pan.

Figure 2:
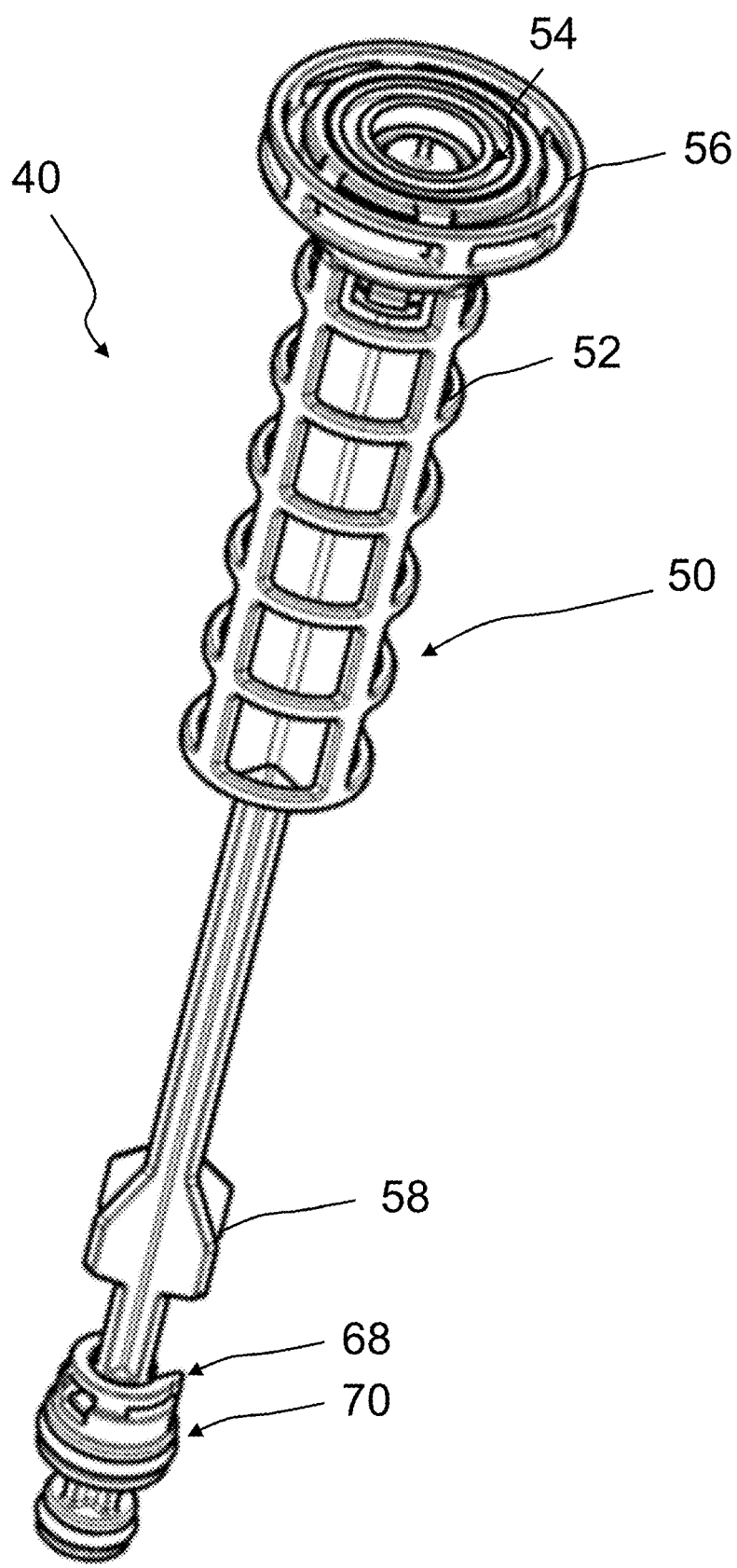
FIG. 2 shows a perspective view of a two-part slide valve with a valve rod and a sealing head according to an embodiment of the invention.

FIG. 2 shows a perspective view of a two-part slide valve 40 with a valve rod 50 and a sealing head 70 according to an embodiment of the invention.

In the cover-near head region 52 of the slide valve 40, the latter comprises a collar 56. In the cover-near head region 52, a bypass valve 54 is arranged with which the filter element (FIG. 1) can be bypassed in emergency operation. In the cover-near region 52, the valve rod 50 comprises a grid-shaped expansion in diameter while the valve rod 50 tapers in the direction toward the sealing head 70. In this region, centering elements 58 are arranged which extend radially away from the valve rod and assist in preventing canting of the slide valve 40 in the housing.

The sealing head 70 is connected by a coupling 68 to the valve rod 50.

Figure 3:
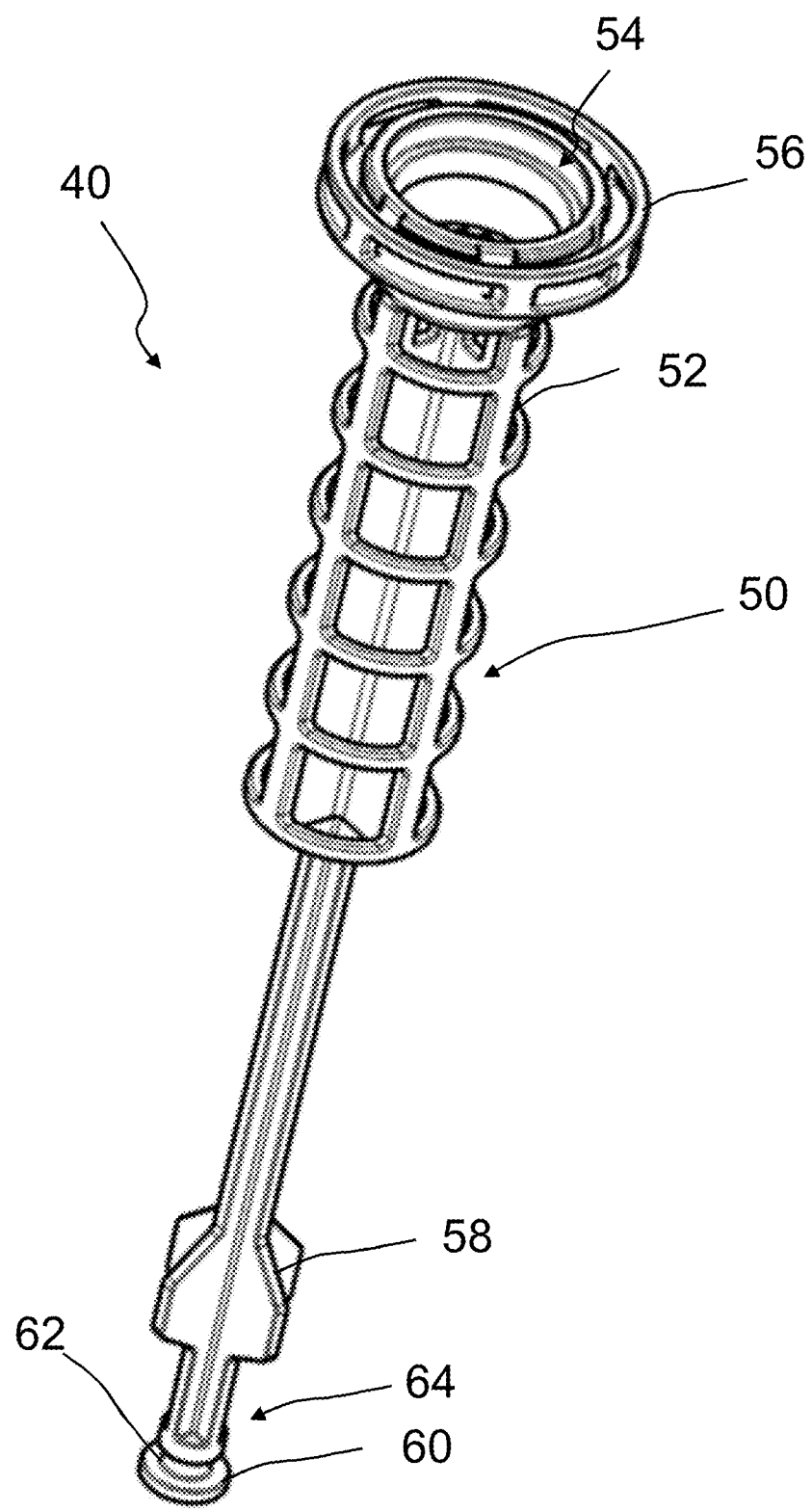
FIG. 3 shows a perspective view of the valve rod of the two-part slide valve of FIG. 2.

FIG. 3 shows a perspective view of the valve rod 50 of the slide valve 40 of FIG. 2 without sealing head 70 and the receptacle for the bypass valve 54 without the bypass valve 54 itself.

Figure 4:
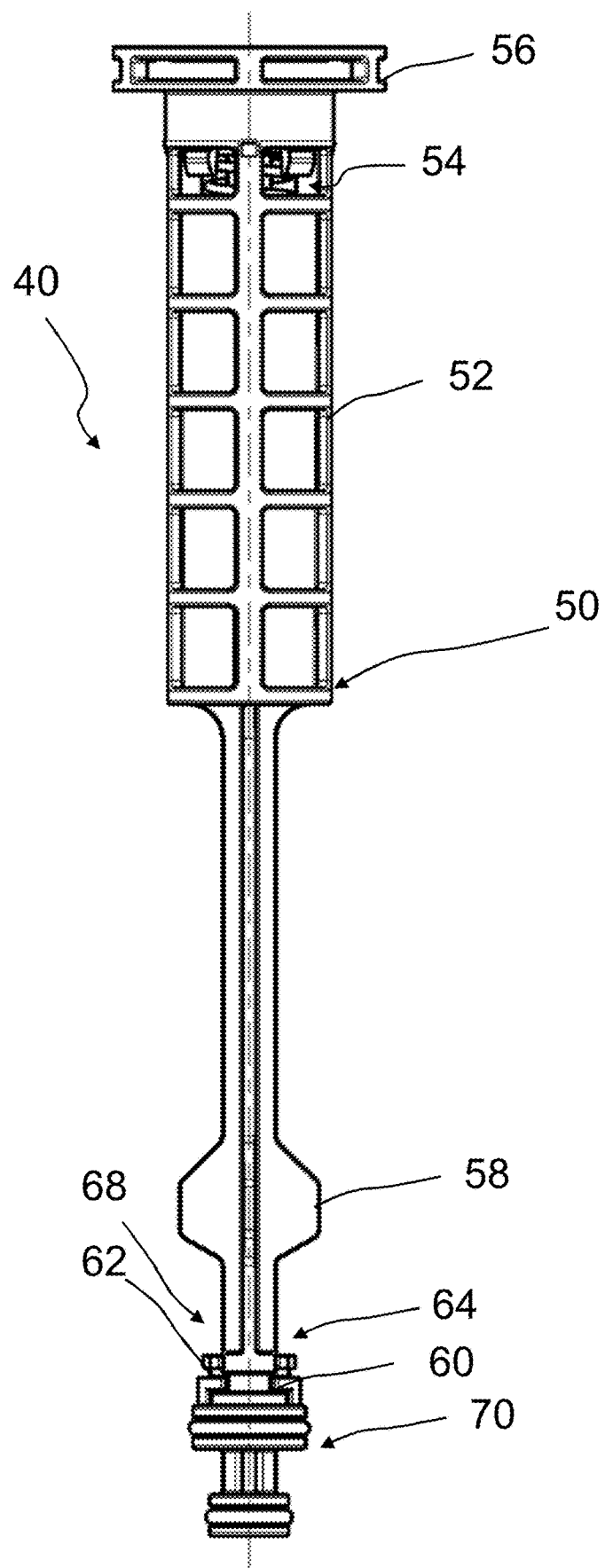
FIG. 4 shows as a side view the slide valve according to FIG. 2 viewed from an insertion side into the sealing head.

FIG. 4 shows the slide valve 40 according to FIG. 2 as a side view, viewed from an insertion side of the valve rod 50 into the sealing head 70.

At the cover-remote end of the valve rod 50, an end segment 64, which ends with a disk 60 that is perpendicular to the longitudinal extension of the valve rod 50 and adjoins the end segment 64 by a constriction 62, follows the centering region 58, which is formed, for example, of radially projecting wings. The disk 60 forms a coupling element with which the valve rod 50 is secured axially in the coupling 68. The coupling 68 is preferably integrated into the sealing head 70. Advantageously, an axial securing action of the valve rod 50 at the sealing head 70 is at least functionally separate from a radial securing action of the valve rod 50 at the sealing head 70.

FIG. 5 shows a longitudinal section through the slide valve 40 according to FIG. 2, and FIG. 6 shows a detail of the coupling 68 between valve rod 50 and sealing head 70 according to FIG. 2 with separate axial securing action and radial securing action of the valve rod 50 at the sealing head 70.

The sealing head 70 comprises a body 72 extending in longitudinal direction that comprises a sealing groove 74 with a seal 76 at one end and a sealing groove 78 with a seal 80 at the oppositely positioned axial end. This end is facing the valve rod 50. The end with the first sealing groove 74 comprises a smaller diameter than the oppositely positioned end and can be matched to the geometry in the housing 10 (FIG. 1). Adjacent to the second sealing groove 78, the sealing head 70 comprises the coupling 68 in which the valve rod 50 is secured axially and radially. The two sealing grooves 74, 78 are axially spaced apart by a region 73 which has a smaller diameter than both regions with the sealing grooves 74, 78.

The coupling 68 comprises a receptacle 82 for the coupling element 60, embodied as a disk, of the valve rod 50 and engages across it with a region 84 whereby the coupling element 60 is secured axially at the sealing head 70. The valve rod 50 comprises a constriction 62 in which the region 84 can engage so that a large portion of the coupling element 60 is covered by the region 84. This provides a robust axial securing action of the valve rod 50 at the sealing head 70.

Farther in axial direction, a clamping element 86, for example, a clip, is provided that is axially spaced apart from the receptacle 82. The clamping element 86 provides a radial securing action of the valve rod 50.

Figure 7:
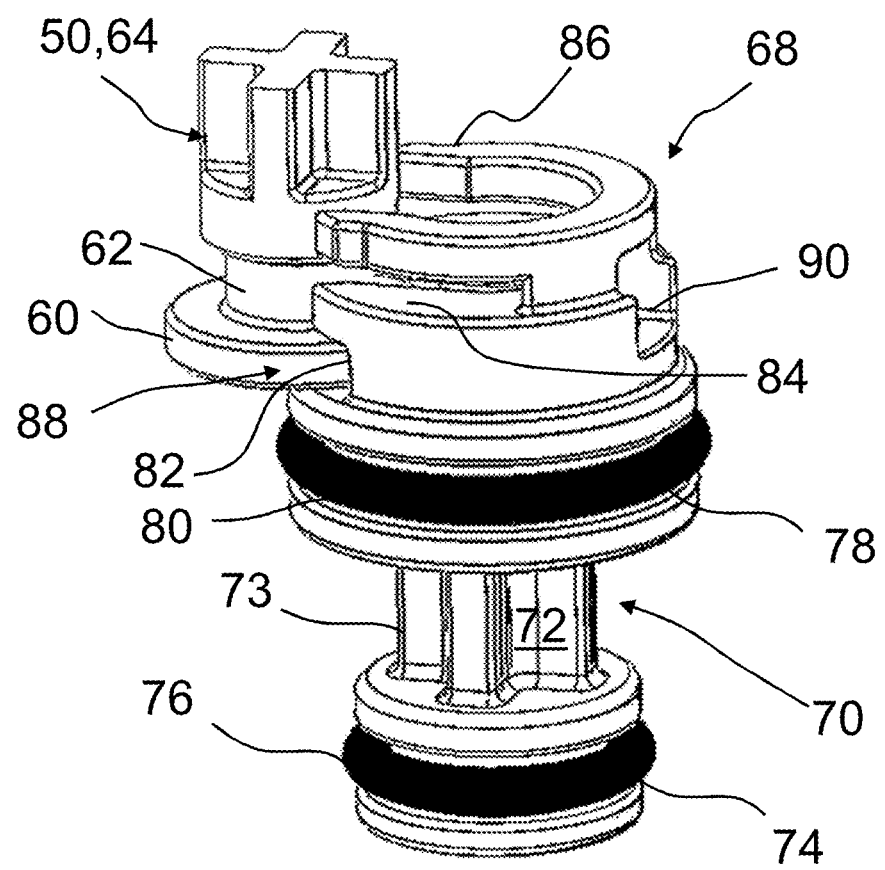
FIG. 7 shows a perspective view of the connection between valve rod and sealing head of FIG. 2 with the valve rod shown during insertion or removal from the sealing head.

FIG. 7 shows an enlarged perspective view of the coupling 68 between a valve rod 50 and sealing head 70 of the slide valve 40 of FIG. 2 with the valve rod 50 shown during insertion or removal from the sealing head 70.

As best shown in FIG. 2 with FIG. 7, the slide valve 40 is arranged in the interior of the housing 10.

The slide valve 40 includes a valve rod 50 which is axially elongated (see FIG. 7) and having an upper axial end and a lower axial end, the elongated valve rod 50 is adapted to extend through an interior of the filter element 16 (see FIG. 2). As shown in the enlarged view of FIG. 7, the valve rod 50 includes a radially outward projecting coupling collar or disk 60 secured on the lower axial end of the valve rod 50. As shown in FIG. 7, a sealing head 70 is exchangeably fastened to the valve rod 50 at the lower axial end of the valve rod, such that the liquid drain 26 of the housing 10 is closable by the sealing head but so as to be openable. As shown in FIG. 7, the sealing head 70 is exchangeably fastened to the valve rod 50 so as to permit removal from the valve rod 50 and for replacement with a new sealing head 70 upon exchange of the filter element 16, without replacing the slide valve 40, thereby reducing waste.

As shown in FIG. 7, the sealing head 70 includes a receptacle 82 embodied as a pocket formed in an interior of the sealing head 70. The receptacle 82 is sized to detachably receive and engage the coupling collar or disk 80 of the valve rod 50, thereby exchangeably fastening the sealing head 70 to the valve rod 50. As shown in FIG. 7, the receptacle 82 has an insertion opening 88 formed in a radially outer wall of the sealing head 70. As shown in FIG. 7, the insertion opening 88 is sized to receive the coupling collar or disk 60 of the valve rod 50 into the receptable 82 of the sealing head 70. When the coupling collar or disk 60 is received into the receptacle 82, an engagement lip 84 (see FIG. 7) of the receptacle 82 engages against and covers at least a part of a rim of the coupling collar or disk 60, thereby axially securing the coupling collar or disk in the receptacle, thereby exchangeably fastening the sealing head 70 onto the valve rod 50.

As shown in FIG. 7, the sealing head 70 has a C-shaped clamping element 86 arranged on an axially outer side of the receptacle 82. The C-shaped clamping element 86 engages about and and circumferentially clamps the valve rod into the C-shaped clamping element 86, thereby radially exchangeably fastening the sealing head 70 onto the valve rod (50). As shown in FIG. 7, the C-shaped clamping element 86 is axially spaced away from the insertion opening 88 and the receptacle 82 of the sealing head 70.

The valve rod 50 can be inserted with its coupling element 60 that is, for example, coupling collar or disk 60 through the insertion opening 88 into the receptacle 82. The receptacle 82 forms a kind of pocket for the coupling element 60 and engages with the region 84 across its rim. The rim of the inner opening within the region 84 encloses the constriction 62 of the valve rod 50 as tightly as possible.

When the valve rod 50 is inserted into the receptacle 82, the valve rod 50 is operatively connected with the C-shaped clamping element 86 and is clamped by it and thus radially secured. For improved clamping action, the valve rod 50 can have a cylindrical contact section. Positioned diametrically opposite the insertion opening 88, the coupling 68 is provided with an ejecting window 90 through which the valve rod 50 can be pushed out when being demounted from the receptacle 82.

Figure 8:
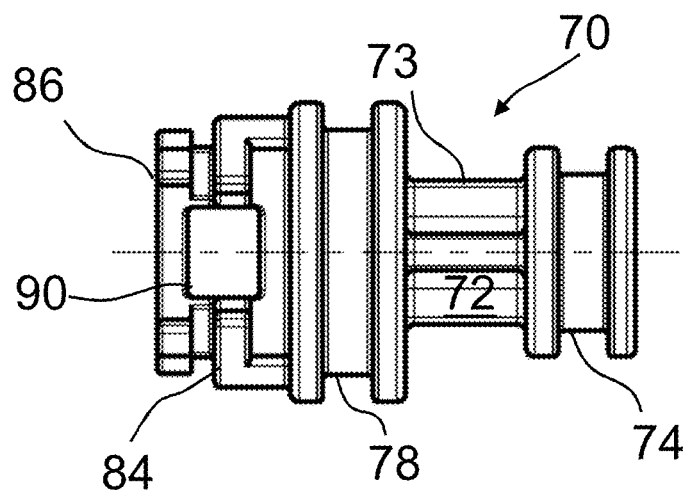
FIG. 8 shows a side view of the sealing head of the slide valve according to FIG. 2 viewed from an ejecting window.
Figure 9:
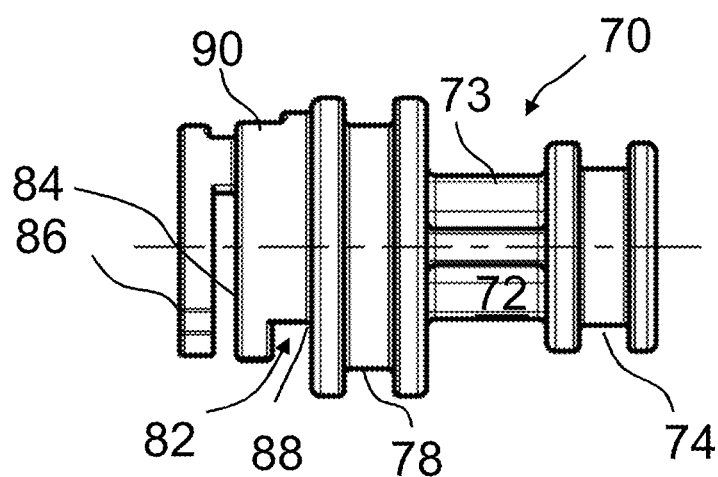
FIG. 9 shows in a side view the sealing head according to FIG. 8 rotated by 90° about its longitudinal axis.
Figure 10:
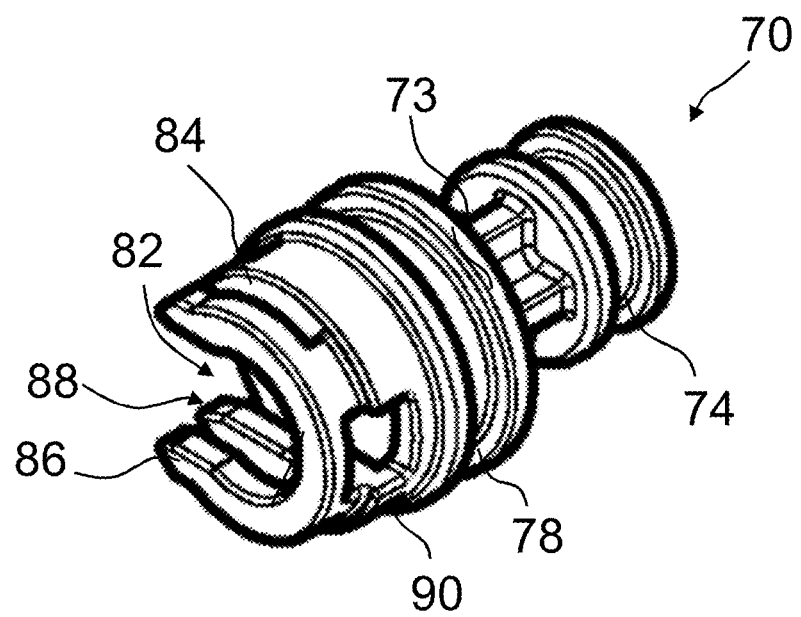
FIG. 10 shows a perspective view of the sealing head according to FIG. 8.

FIGS. 8 through 10 show various views of the sealing head 70, wherein FIG. 8 shows a side view of the sealing head 70 viewed from the ejecting window 90; FIG. 9 shows in a side view the sealing head 70 according to FIG. 8 rotated by 90° about its longitudinal axis; and FIG. 10 shows a perspective view of the sealing head 70 according to FIG. 8.

Figure 11:
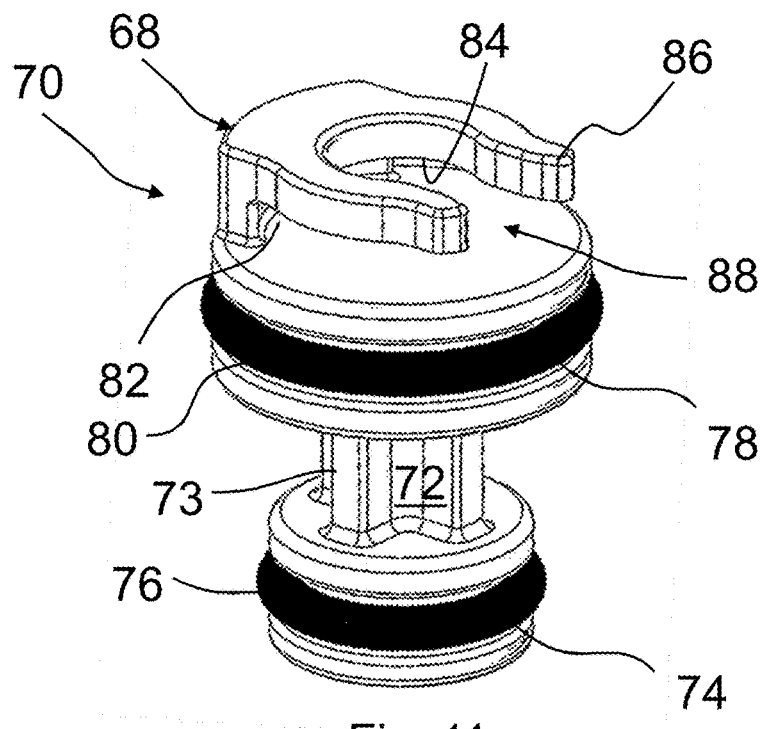
FIG. 11 shows a perspective view of a sealing head with separate axial and radial securing actions for a valve rod according to a further embodiment of the invention.

FIG. 11 shows a perspective view of a sealing head 70 with separate axial and radial securing actions for a valve rod 50 according to a further embodiment of the invention.

The axial distance between the receptacle 82 for the coupling element 60 of the valve rod 50 is smaller than in the preceding embodiment and is formed by a rim region of the clamping element 86. In this way, a smaller segment of the coupling element 60 is covered by a region 84 of the receptacle 82.

Figure 12:
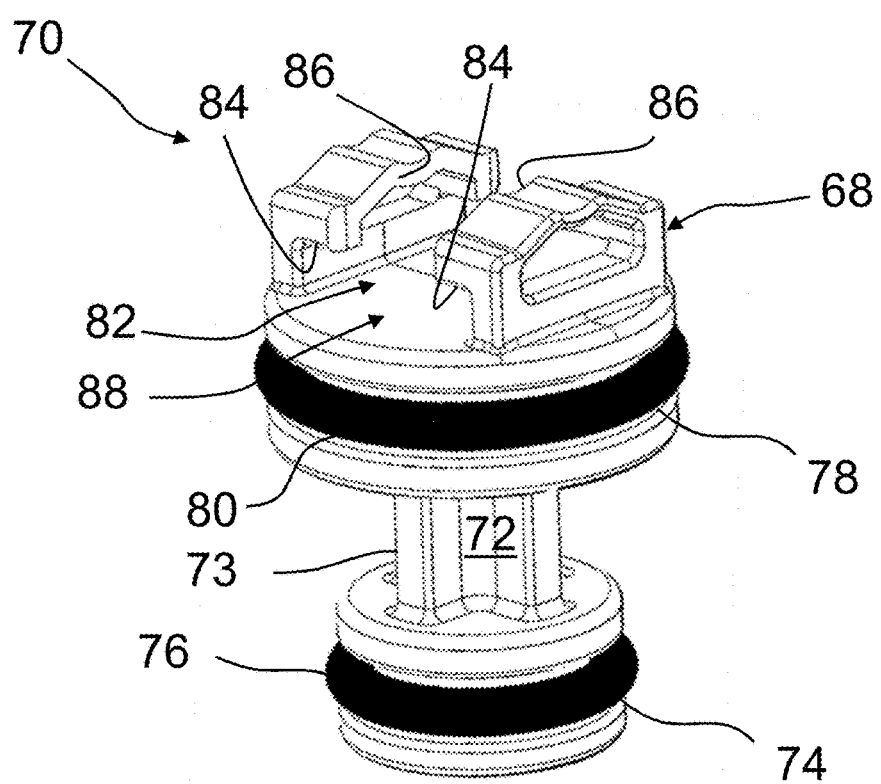
FIG. 12 shows a perspective view of a sealing head with separate axial and radial securing actions for a valve rod according to a further embodiment of the invention.

FIG. 12 shows a perspective view of a sealing head 70 with separate axial and radial securing actions for a valve rod 50 according to a further embodiment of the invention. The coupling 68 is formed by two diametrically opposed elements, between which the valve rod 50 is insertable with its disk-shaped coupling element 60 (FIG. 3). The receptacle 82 is embodied straight, respectively. A clamping element 86 is formed on the region 84 of the receptacle 82 of the respective element, which region is provided to cover the coupling element 60 of the valve rod 50, so that, when the valve rod 50 is inserted, the clamping elements 86 are contacting the latter at both sides of the valve rod 50.

What is claimed is:

1. A filter system comprising:
a housing comprising a cover, wherein the housing comprises a raw liquid inlet, a clean liquid outlet, and a liquid drain;
a filter element arranged in an interior of the housing and separating a raw side from a clean side;
a slide valve arranged in the interior of the housing, the slide valve comprising:
a valve rod which is axially elongated and having an upper axial end and a lower axial end, the elongated valve rod adapted to extend through an interior of the filter element, the valve rod comprising:
a coupling collar or disk projecting radially outward from the valve rod;
a sealing head exchangeably fastened to the valve rod such that the liquid drain of the housing is closable by the sealing head but so as to be openable;
wherein the sealing head is exchangeably fastened to the valve rod for removal from the valve rod and replacement with a new sealing head upon exchange of the filter element, the exchangeable fastening thereby reducing waste by reusing remaining components of the slide valve, the sealing head comprising:
a receptacle embodied as a pocket sized to detachably receive and engage the coupling collar or disk, exchangeably fastening the sealing head to the valve rod;
wherein the receptacle has an insertion opening formed in a radially outer wall of the sealing head, the insertion opening sized to receive the coupling collar or disk of the valve rod into the receptacle of the sealing head;
wherein when the coupling collar or disk is received into the receptacle, an engagement lip of the receptacle engages against and covers at least a part of a rim of the coupling collar or disk, axially securing the coupling collar or disk in the receptacle, thereby exchangeably fastening the sealing head onto the valve rod.

2. The filter system according to claim 1, wherein the valve rod is fastened to the cover of the housing.

3. The filter system according to claim 1, wherein the sealing head is configured to be removed with the valve rod from the housing without being destroyed.

4. The filter system according to claim 1, wherein the sealing head comprises two sealing elements that are axially spaced apart from each other.

5. The filter system according to claim 1, wherein the receptacle embodied as a pocket is formed in an interior of the sealing head.

6. The filter system according to claim 1, wherein the coupling collar or disk is secured on the lower axial end of the valve rod and projecting radially outward from the valve rod.

7. The filter system according to claim 1, wherein the sealing head is exchangeably fastened to the valve rod at the lower axial end of the valve rod.

8. The filter system according to claim 1, further comprising:
a clamping element arranged on an axially outer side of the receptacle of the sealing head, the clamping element sized and configured to circumferentially engage about and clamp the valve rod into the clamping element, thereby radially fastening the sealing head exchangeably onto the valve rod,
wherein the clamping element is axially spaced away from the insertion opening and receptacle of the sealing head.

9. The filter system according to claim 8, wherein the clamping element is a C-shaped clamping element circumferentially engaging about the valve rod.

* * * * *